United States Patent
Kim et al.

(10) Patent No.: US 9,252,422 B2
(45) Date of Patent: Feb. 2, 2016

(54) POSITIVE ELECTRODE FOR RECHARGEABLE LITHIUM BATTERY AND RECHARGEABLE LITHIUM BATTERY INCLUDING SAME

(75) Inventors: Jun-Sik Kim, Yongin-si (KR);
Tae-Keun Kim, Yongin-si (KR);
Jin-Kyu Hong, Yongin-si (KR);
Sung-Soo Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 1267 days.

(21) Appl. No.: 13/007,417

(22) Filed: Jan. 14, 2011

(65) Prior Publication Data

US 2012/0064398 A1    Mar. 15, 2012

(30) Foreign Application Priority Data

Sep. 13, 2010   (KR) ......................... 10-2010-0089564

(51) Int. Cl.
*H01M 4/583* (2010.01)
*H01M 4/36* (2006.01)
*H01M 4/62* (2006.01)
(Continued)

(52) U.S. Cl.
CPC .............. *H01M 4/131* (2013.01); *B01J 20/20* (2013.01); *B01J 20/2803* (2013.01); *B01J 20/28066* (2013.01); *B01J 20/28069* (2013.01); *C01B 31/08* (2013.01); *H01M 4/364* (2013.01); *H01M 4/505* (2013.01); *H01M 4/525* (2013.01); *H01M 4/625* (2013.01); *H01M 4/628* (2013.01); *C01P 2002/02* (2013.01); *C01P 2006/12* (2013.01); *H01M 4/621* (2013.01); *H01M 10/0525* (2013.01); *H01M 2004/021* (2013.01); *Y02E 60/122* (2013.01)

(58) Field of Classification Search
USPC ......... 429/188, 189, 301–347, 199–207, 208, 429/209–246; 252/182.1, 500, 184
See application file for complete search history.

(56) References Cited

U.S. PATENT DOCUMENTS 6,558,846 B1   5/2003   Tsushima et al.
6,863,876 B2   3/2005   Davis et al.
(Continued)

FOREIGN PATENT DOCUMENTS

EP   2 221 841 A1   8/2010
EP   2 224 514 A1   9/2010
(Continued)

OTHER PUBLICATIONS

Japanese Office Action dated Mar. 11, 2014, issued in connection with corresponding Japanese Patent Application No. 2011-063553.
(Continued)

*Primary Examiner* — Basia Ridley
*Assistant Examiner* — Caitlin Wilmot
(74) *Attorney, Agent, or Firm* — Knobbe Martens Olson & Bear LLP

(57) ABSTRACT

Disclosed is rechargeable lithium battery that includes a positive electrode including a positive active material layer, a negative electrode including a negative active material and an electrolyte wherein the positive active material layer includes a positive active material, a binder, a conductive material, and an activated carbon, the activated carbon includes micropores in which manganese ions are adsorbed and trapped, and the activated carbon is included in an amount of about 0.1 wt % to about 3 wt % based on the total weight of the positive active material layer.

11 Claims, 4 Drawing Sheets

(51) Int. Cl.
    *H01M 4/131*     (2010.01)
    *B01J 20/20*     (2006.01)
    *B01J 20/28*     (2006.01)
    *C01B 31/08*     (2006.01)
    *H01M 4/505*     (2010.01)
    *H01M 4/525*     (2010.01)
    *H01M 10/0525*     (2010.01)
    *H01M 4/02*     (2006.01)

(56) References Cited

U.S. PATENT DOCUMENTS

| | | | |
|---|---|---|---|
| 7,776,472 | B2 | 8/2010 | Kim et al. |
| 7,816,037 | B2 | 10/2010 | Ohta et al. |
| 2003/0010712 | A1 | 1/2003 | Gao et al. |
| 2007/0251827 | A1 | 11/2007 | Park et al. |
| 2008/0113256 | A1 | 5/2008 | Reshetenko et al. |
| 2010/0276631 | A1* | 11/2010 | Mabuchi et al. ........... 252/182.1 |

FOREIGN PATENT DOCUMENTS

| | | |
|---|---|---|
| JP | 2000-077103 | 3/2000 |
| JP | 2001-110418 | 4/2001 |
| JP | 2003-168420 | 6/2003 |
| JP | 2004-524967 A | 8/2004 |
| JP | 2005-137973 A | 6/2005 |
| JP | 2007-311296 | 11/2007 |
| JP | 2007-317583 | 12/2007 |
| JP | 2008-112594 | 5/2008 |
| JP | 2008-112595 A | 5/2008 |
| JP | 2009-054318 | 3/2009 |
| JP | 2009-205918 | 9/2009 |
| KR | 10-2005-0116171 A | 12/2005 |
| KR | 10-2008-0029480 A | 4/2008 |
| KR | 1020090085756 A | 8/2009 |
| WO | WO2009/072381 A1 | 6/2009 |

OTHER PUBLICATIONS

First Office Action issued on Oct. 10, 2013 by the Patent Office of the People's Republic of China in Chinese Patent Application 201110090209.8.

Japanese Office Action dated Nov. 19, 2013, issued in connection with corresponding Japanese Patent Application No. 2011-063553.

Extended European Search Report issued by the European Patent Office dated Dec. 30, 2011, 23 pages.

Chinese Second Office Action dated May 5, 2014, issued in connection with corresponding Chinese Patent Application No. 201110090209.8.

* cited by examiner

POSITIVE ELECTRODE FOR RECHARGEABLE LITHIUM BATTERY AND RECHARGEABLE LITHIUM BATTERY INCLUDING SAME

CROSS-REFERENCE TO RELATED APPLICATIONS

This application claims priority to and the benefit of Korean Patent Application No. 10-2010-0089564 filed in the Korean Intellectual Property Office on Sep. 13, 2010, the entire contents of which are incorporated herein by reference.

BACKGROUND

1. Field

This disclosure relates to a positive electrode for a rechargeable lithium battery and a rechargeable lithium battery including the same.

2. Description of the Related Technology

Lithium rechargeable batteries have recently drawn attention as a power source of small portable electronic devices. They use an organic electrolyte solution and thereby have twice the discharge voltage of a conventional battery using an alkali aqueous solution, and accordingly have high energy density.

In order to commercially develop a medium-large sized rechargeable lithium battery, it is important to reduce the cost of battery per a capacity together with to accomplish the mass production of battery.

To reduce the cost of battery per capacity, it has been suggested to include manganese (Mn)-based positive active material.

However, the manganese-based positive active material elutes Mn ions on the surface of manganese-based positive active material particle during the charge and discharge, generating defects in the positive active material. It is further actively reacted when contacting with the electrolyte, particularly, at high temperatures.

According to the reaction, manganese is eluted from the positive active material to collapse the positive active material. In addition, the eluted manganese ion is on the surface of negative electrode and inhibits the charge and discharge reaction of negative electrode. Thereby, the battery performance is deteriorated, and particularly, the cycle-life is deteriorated. The present embodiments overcome the above problems and also provide additional advantages.

SUMMARY

One embodiment provides a rechargeable lithium battery having excellent cycle-life characteristics.

According to one embodiment, a rechargeable lithium battery is provided that includes a positive electrode including a positive active material layer, a negative electrode including a negative active material and an electrolyte wherein the positive active material layer includes a positive active material, a binder, a conductive material, and an activated carbon, the activated carbon includes micropores in which manganese ions are adsorbed and trapped, and the activated carbon is included in an amount of about 0.1 wt % to about 3 wt % based on the total weight of the positive active material layer.

The micropores may have a size of about 20 Å or less, or about 5 Å to about 20 Å.

The activated carbon may further include mesopores in which manganese ions are adsorbed and trapped.

A size of the mesopores may be greater than about 20 Å and less than or equal to about 500 Å (20 Å<size of the mesopores≤500 Å).

The activated carbon may include the micropore and mesopore at a volume ratio of about 90:10 to about 50:50.

The activated carbon may have a specific surface area of about 1,000 m$^2$/g or more, or from about 1,000 m$^2$/g to about 2,500 m$^2$/g.

The activated carbon may be amorphous carbon.

The activated carbon may be amorphous carbon which is began to oxidize-decompose prior to 600° C., when it heated by increasing a temperature at an increasing rate of about 1° C./min to about 10° C./min to using a thermogravimetric analyzer.

The positive active material may include a compound selected from the group consisting of the compounds represented by the following Chemical Formulae 1 and 2 and a combination thereof.

$$LiMn_{2-b}D_bO_{4-c}J_c$$ 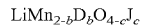 [Chemical Formula 1]

wherein,

D is selected from the group consisting of Al, Ni, Co, Mn, Cr, Fe, Mg, Sr, V, a rare earth element, and a combination thereof, J is selected from the group consisting of F, S, P, and a combination thereof, and $0 \leq b \leq 0.5$, $0 \leq c \leq 0.05$.

$$Li_aMn_bCo_cNi_dL_eO_2$$ 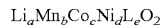 [Chemical Formula 2]

wherein,

L is Al, Cr, Mn, Fe, Mg, La, Ce, Sr, V, or a combination thereof, and $0.90 \leq a \leq 1.8$, $0 \leq b \leq 0.9$, $0 \leq c \leq 0.5$, $0 \leq d \leq 0.5$, and $0.001 \leq e \leq 0.1$.

According to another embodiment, a rechargeable lithium battery is provided that includes the positive electrode, a negative electrode including a negative active material, and an electrolyte.

The positive electrode for a rechargeable lithium battery according to one embodiment adsorbs the eluted manganese and stabilizes the battery to improve the cycle-life characteristic of battery.

DETAILED DESCRIPTION

Figure 1:
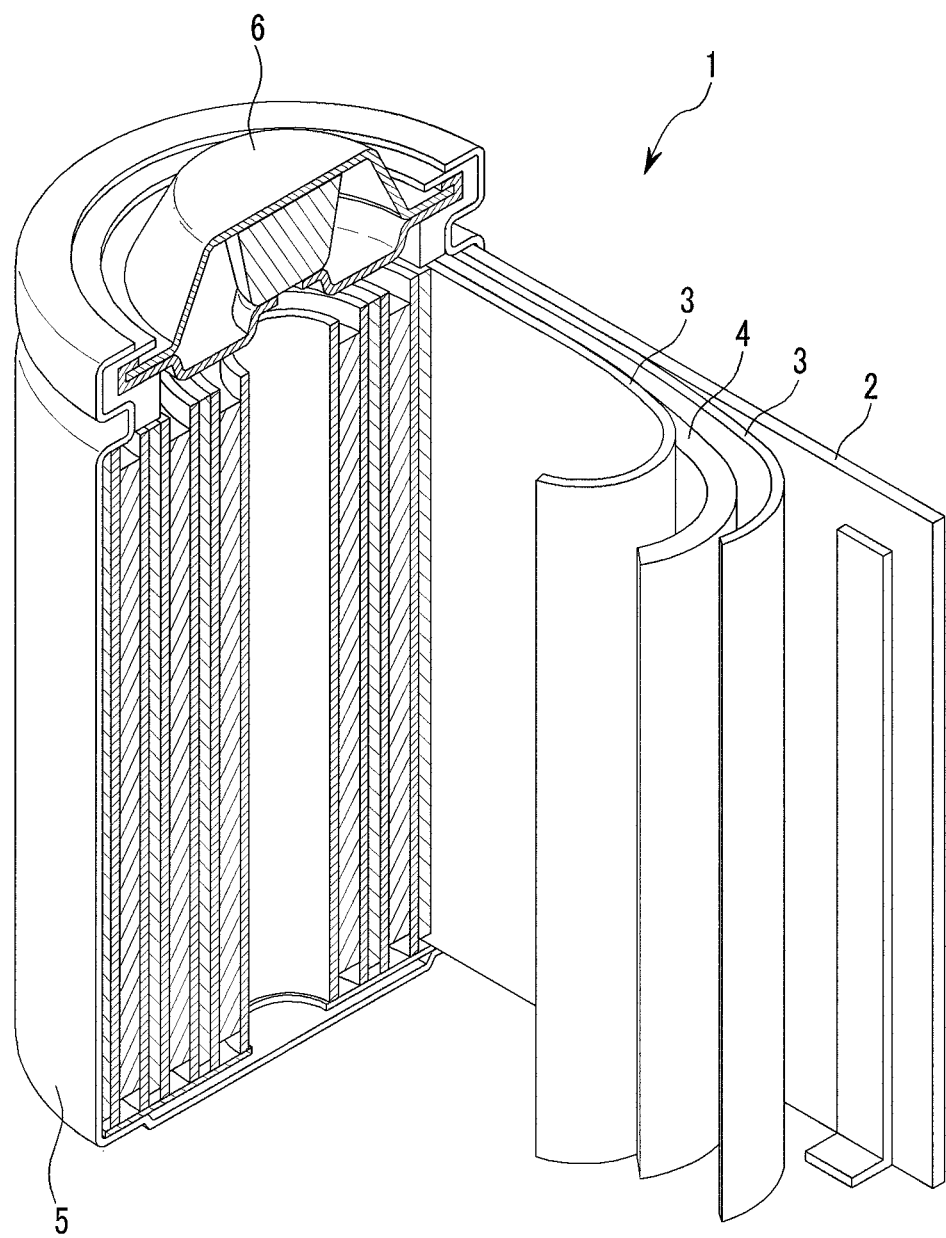
FIG. 1 shows a structure of a rechargeable lithium battery according to one embodiment.

This disclosure will be described more fully hereinafter with reference to the accompanying drawings, in which example embodiments are shown. As those skilled in the art would realize, the described embodiments may be modified in various different ways, all without departing from the spirit or scope of the present embodiments.

The rechargeable lithium battery according to some embodiments includes a positive electrode including a positive active material layer including a positive active material, a binder, a conductive material, and activated carbon; a negative electrode including a negative active material; and an electrolyte.

The activated carbon includes micropores. The micropore is present in a state in which manganese ion is adsorbed and trapped in the battery.

The micropores may have a pore size of about 20 Å or less, or about 5 Å to about 20 Å. The micropore may well adsorb manganese ion. Accordingly, the activated carbon adsorbs manganese ion eluted from the positive active material, for example, manganese-based positive active material during the charge and discharge, so it may prevent the problems caused when eluted manganese ion is transferred to the negative electrode and located on the surface of negative electrode which inhibits the charge and discharge reaction in the negative electrode. The deterioration of battery performance according to eluting manganese ion is mainly caused by manganese ion on the surface of negative electrode which collapses the negative electrode coating layer (SEI (solid electrolyte interface) layer) and generates side reaction gas rather than by eluting the manganese ion from the positive electrode to collapse the positive active material, resulting in inhibiting the charge and discharge reaction. The rechargeable lithium battery according to one embodiment prevents the eluted manganese ion from filling up on the surface of the negative electrode by including an activated carbon having micropores capable of adsorbing and trapping manganese ion. Thereby, it may improve the battery performance, particularly, the cycle-life characteristic.

The activated carbon may further include mesopores. The mesopore may be also present in a state capable of adsorbing and trapping manganese ion in the battery. A size of the mesopores may be greater than about 20 Å and less than or equal to about 500 Å (20 Å<size of the mesopores≤500 Å).

If the activated carbon includes both micropore and mesopore, it may have the volume ratio between micropore and mesopore of from about 9:1 to about 1:1. When micropore and mesopore have the volume ratio within the range, it may effectively adsorb and trap the eluted manganese ion.

The activated carbon according to one embodiment includes micropores and mesopores, which does not include macropore having a size of more than about 500 Å. However, macropores may be spontaneously generated during the process of manufacturing the activated carbon, so a trace amount thereof may be present. Macropores may be present in an amount of about 10 parts by volume based on about 100 parts by volume of entire pore of activated carbon, which is the spontaneously generated amount. The macropore refers to pore having a size of more than about 500 Å. The largest size is not limited, but one example is a pore having a size of about 3,000 Å.

The activated carbon may have a specific surface area of about 1,000 m²/g or more or from about 1,000 m²/g to about 2,500 m²/g.

The activated carbon may be amorphous carbon, which is confirmed by showing no peak of specific crystalline but showing a broad shoulder (approximately around 2θ=20°, but it is not limited thereto) when measured by the X-ray diffraction using a CuKα ray.

When the activated carbon is heated by increasing a temperature at an increasing rate of about 1° C./min to about 10° C./min, it may be begin to oxidize-decompose prior to about 600° C. The heating treatment may be performed under an oxygen atmosphere or air atmosphere. The oxidation-decomposition characteristic may be confirmed using a thermogravimetric analyzer.

The activated carbon may have different physical properties from that the commonly-used carbon black for a conductive material which is heat-decomposed at a temperature of about 700° C. or higher. When the material obtained by separating from the positive active material layer of the positive electrode obtained by dissembling the battery is heated under the above heating condition using a thermogravimetric analyzer, it may be confirmed as the activated carbon according to one embodiment if it is oxidized-decomposed before prior to about 600° C.; on the other hand, it may be confirmed as a commonly-used conductive material if it is oxidized-decomposed at the temperature of about 700° C. or higher. In addition, the amounts of activated carbon and conductive material included in the electrode may be determined from the above technique.

The activated carbon may be included in about 0.1 wt % to about 3 wt %, or for example, about 0.1 wt % to about 2 wt % or about 1 wt % to about 2 wt % based on the total weight of positive active material layer which is about 100 wt % of total weight of the positive active material, the activated carbon, the conductive material, and the binder. When the activated carbon is included within the range from about 0.1 wt % to about 2 wt %, the ability of absorbing manganese ion is enhanced, so that it may effectively absorb the manages ion eluted from positive active material battery to improve the cycle-life characteristic and the reliability.

The positive active material may include a compound selected from the group consisting of the compounds represented by the following Chemical Formulae 1 and 2, and a combination thereof.

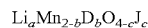  [Chemical Formula 1]

wherein,

D is selected from the group consisting of Al, Ni, Co, Mn, Cr, Fe, Mg, Sr, V, a rare earth element, and a combination thereof, J is selected from the group consisting of F, S, P, and a combination thereof, and 0.90≤a≤1.8, 0≤b≤0.5, and 0≤c≤0.05.

  [Chemical Formula 2]

wherein,

L is Al, Cr, Mn, Fe, Mg, La, Ce, Sr, V, or a combination thereof, and, 0.90≤a≤1.8, 0≤b≤0.9, 0≤c≤0.5, 0≤d≤0.5, and 0.001≤e≤0.1.

In the positive active material layer, the positive active material may be included in an amount of about 80 wt % to about 97.9 wt % based on the total weight of the positive active material layer.

The positive active material layer may also include a binder and a conductive material. The binder and conductive material may be included in an amount of about 1 wt % to about 10 wt %, respectively, based on the total weight of the positive active material layer.

The binder improves binding properties of positive active material particles with one another and with a current collector. Examples of the binder include at least one selected from the group consisting of polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any electrically conductive material may be used as a conductive material unless it causes a chemical change. The activated carbon according to one embodiment has low conductivity, and thus does not act as a conductive material. Therefore, in one embodiment, generally-used conductive material is included in a positive electrode along with activated carbon to ensure conductivity.

Examples of the conductive material include a carbonaceous material such as natural graphite, artificial graphite, carbon black, acetylene black, ketjen black, a carbon fiber, and the like; a metal-based material such as a metal powder or a metal fiber of copper, nickel, aluminum, silver, and the like; a conductive polymer material of a polyphenylene derivative; or a mixture thereof.

The current collector may include aluminum (Al) foil, but is not limited thereto.

The positive electrode may be fabricated by a method including mixing a positive active material, a conductive material, and activated carbon in a solvent to provide a positive active material composition, and coating the positive active material composition on a current collector. The electrode manufacturing method is not described in detail in the present specification. The solvent includes N-methylpyrrolidone and the like, but is not limited thereto.

The negative electrode includes a current collector and a negative active material layer disposed on the current collector. The negative active material layer includes a negative active material.

The negative active material includes a material that reversibly intercalates/deintercalates lithium ions, a lithium metal, a lithium metal alloy, a material being capable of doping and dedoping lithium, a material being capable of reacting with lithium ions to form a lithium-containing compound, or a transition metal oxide. Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the transition metal oxide, the material being capable of doping and dedoping lithium, and the a material being capable of reacting lithium ions to form a lithium-containing compound may include vanadium oxide, lithium vanadium oxide, Si, $SiO_x$ ($0<x<2$), a Si—X alloy (where X is an element selected from the group consisting of an alkali metal, an alkaline-earth metal, a group 13 element, a group 14 element, a group 15 element, a group 16 element, a transition element, a rare earth element, and a combination thereof but not Si), Sn, $SnO_2$, a Sn—X alloy (where is an element selected from the group consisting of an alkali metal, an alkaline-earth metal, a group 13 element, a group 14 element, a group 15 element, a group 16 element, a transition element, a rare earth element, and a combination thereof but not Sn), and the like. At least one of these materials may be mixed with $SiO_2$. The element X may independently include at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, 5, Se, Te, Po, and a combination thereof.

The material that reversibly intercalates/deintercalates lithium ions includes a carbonaceous material. The carbon material may be any generally-used carbon-based negative active material in a lithium ion rechargeable battery. Examples of the carbonaceous material include crystalline carbon, amorphous carbon, and a mixture thereof. The crystalline carbon may be non-shaped or sheet, flake, spherical, or fiber shaped natural graphite or artificial graphite. The amorphous carbon may be a soft carbon, a hard carbon, mesophase pitch carbide, fired coke, and the like.

In the negative active material layer, the negative active material may be included in an amount of about 95 wt % to about 99 wt % based on the total weight of the negative active material layer.

The negative active material layer includes a negative active material, a binder, and optionally a conductive material. In the negative active material layer, the binder may be included in an amount of about 1 wt % to about 5 wt % based on the total weight of the negative active material layer. In addition, when it further includes a conductive material, it may include about 90 wt % to about 98 wt % of the negative active material, about 1 wt % to about 5 wt % of the binder, and about 1 wt % to about 5 wt % of the conductive material.

The binder improves binding properties of the negative active material particles to each other and to a current collector. The binder includes a non-water-soluble binder, a water-soluble binder, or a combination thereof The non-water-soluble binder includes polyvinylchloride, carboxylated polyvinylchloride, polyvinylfluoride, polymer including ethylene oxide, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer of propylene and C2 to C8 olefin, a copolymer of (meth)acrylic acid and (meth)acrylic acid alkyl ester, or a combination thereof.

When the negative electrode binder includes a water-soluble binder, it may further include a cellulose-based compound for providing the viscosity as an agent for increasing viscosity. The cellulose-based compound may include a mixture of at least one of carboxylmethyl cellulose, hydroxypropylmethyl cellulose, methyl cellulose, an alkaline metal salt thereof, or the like. The alkaline metal may include Na, K, or Li. The agent for increasing viscosity may be added at about 0.1 to about 3 parts by weight based on 100 parts by weight of the binder.

The conductive material is included to improve electrode conductivity. Any electrically conductive material may be used as a conductive material unless it causes a chemical change. Examples of the conductive material include carbonaceous materials such as natural graphite, artificial graphite, carbon black, acetylene black, ketjen black, carbon fiber, and the like; metal-based materials including a metal powder or a metal fiber of copper, nickel, aluminum, silver, and the like; conductive polymers such as polyphenylene derivatives; or mixtures thereof.

The current collector may be selected from a copper foil, a nickel foil, a stainless steel foil, a titanium foil, a nickel foam, a copper foam, a polymer substrate coated with a conductive metal, and a combination thereof.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. Examples of the ester-based solvent include methyl acetate, ethyl acetate, n-propyl acetate, dimethyl acetate, methyl propinonate, ethyl propinonate, γ-butyrolactone, decanolide, valero lactone, mevalonolactone, caprolactone, and the like. Examples of the ether-based solvent include dibutyl ether, tetraglyme, diglyme, 1,2-dimethoxy ethane, 1,2-diethoxy ethane, ethoxymethoxy ethane, 2-methyltetrahydro furan, tetrahydro furan, and the like, and examples of the ketone-based solvent may include cyclohexanone, and the like. Examples of the alcohol-based solvent may include ethanol, isopropyl alcohol, or a combination thereof. Examples of the aprotic solvent may include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be controlled in accordance with a desirable battery performance.

The carbonate-based solvent may include a mixture of a cyclic carbonate and a linear carbonate. The cyclic carbonate and the chain carbonate are mixed together in the volume ratio of about 1:1 to about 1:9. When the mixture is used as an electrolyte, the electrolyte performance may be enhanced.

In addition, the non-aqueous organic electrolyte may further include mixtures of carbonate-based solvents and aromatic hydrocarbon-based solvents. The carbonate-based solvents and the aromatic hydrocarbon-based solvents may be mixed together in the volume ratio of about 1:1 to about 30:1.

The aromatic hydrocarbon-based organic solvent may be represented by the following Chemical Formula 3.

[Chemical Formula 3]

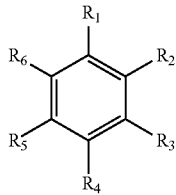

wherein, $R_1$ to $R_6$ are the same or different, and independently selected from hydrogen, a halogen, a C1 to C10 alkyl group, a C1 to C10 haloalkyl group, and a combination thereof.

The aromatic hydrocarbon-based organic solvent may include, but is not limited to, at least one selected from benzene, fluoro benzene, 1,2-difluoro benzene, 1,3-difluorobenzene, 1,4-difluoro benzene, 1,2,3-trifluoro benzene, 1,2,4-trifluoro benzene, chloro benzene, 1,2-dichloro benzene, 1,3-dichloro benzene, 1,4-dichloro benzene, 1,2,3-trichloro benzene, 1,2,4-trichloro benzene, iodo benzene, 1,2-diiodo benzene, 1,3-diiodobenzene, 1,4-diiodo benzene, 1,2,3-triiodo benzene, 1,2,4-triiodo benzene, toluene, fluoro toluene, 1,2-difluoro toluene, 1,3-difluoro toluene, 1,4-difluorotoluene, 1,2,3-trifluoro toluene, 1,2,4-trifluoro toluene, chloro toluene, 1,2-dichloro toluene, 1,3-dichloro toluene, 1,4-dichloro toluene, 1,2,3-trichloro toluene, 1,2,4-trichlorotoluene, iodo toluene, 1,2-diiodo toluene, 1,3-diiodo toluene, 1,4-diiodo toluene, 1,2,3-triiodo toluene, 1,2,4-triiodo toluene, xylene, and a combination thereof.

The non-aqueous electrolyte may further include vinylene carbonate or an ethylene carbonate-based compound of the following Chemical Formula 4.

[Chemical Formula 4]

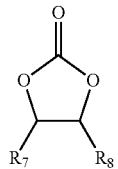

wherein, $R_7$ and $R_8$ are the same or different, and are independently selected from hydrogen, a halogen, a cyano group (CN), a nitro group ($NO_2$), and a fluorinated C1 to C5 alkyl group, provided that at least one of $R_7$ and $R_8$ is a halogen, a cyano group (CN), a nitro group ($NO_2$), and a fluorinated C1 to C5 alkyl group, and $R_7$ and $R_8$ are not simultaneously hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the additive for improving cycle life may be adjusted within an appropriate range.

The lithium salt supplies lithium ions in the battery, operates a basic operation of a rechargeable lithium battery, and improves lithium ion transportation between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiCF_3SO_3$, $LiC_4F_9SO_3$, $LiC_6H_5SO_3$, LiSCN, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalato borate, LiBOB). The lithium salt may be used in a concentration ranging from about 0.1M to about 2.0M. When the lithium salt is included in the above concentration range, electrolyte performance and lithium ion mobility may be enhanced due to optimal electrolyte conductivity and viscosity.

The rechargeable lithium battery may further include a separator between the negative electrode and the positive electrode, as needed. Examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, including cylindrical, prismatic, or coin-type batteries, and may be a thin film battery or be rather bulky in size.

FIG. 1 illustrates a schematic view showing the representative structure of a rechargeable lithium battery according to one embodiment. However, the structure of the rechargeable lithium battery is not limited the structure of FIG. 1, and may include any well known structure such as a prismatic, cylindrical, coin-type, bottom-type, sheet-type laminated, flat shape, or the like.

Referring to FIG. 1, the rechargeable lithium battery 1 is prepared including a negative electrode 2, a positive electrode 3, a separator 4 disposed between the negative electrode 2 and the positive electrode 3, an electrolyte (not shown) impregnated in the negative electrode 2, the positive electrode 3, and the separator 4, a battery case 5, and a sealing member 6 sealing the battery case 5.

The following examples illustrate the present embodiments in more detail. These examples, however, should not in any sense be interpreted as limiting the scope of the present embodiments.

Experimental Example

Figure 2:
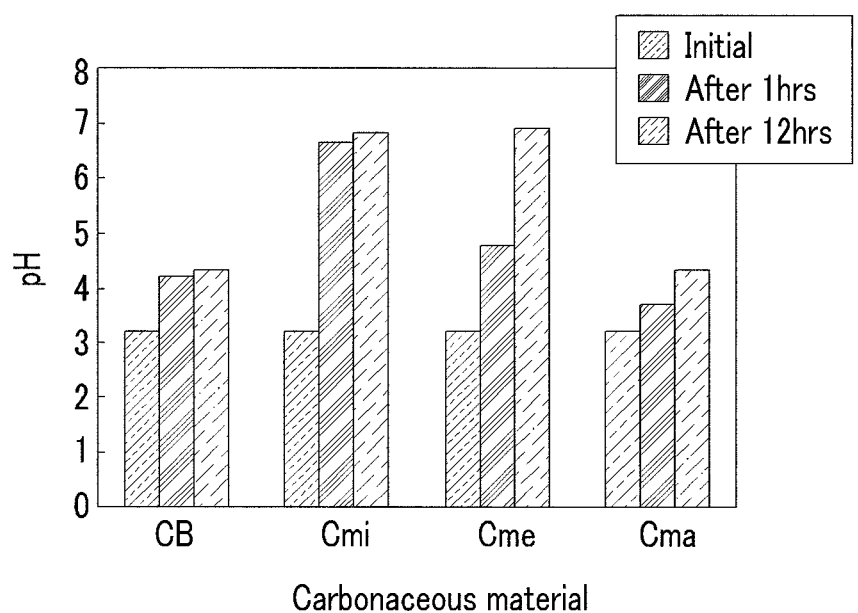
FIG. 2 is a graph showing pH change according to dipping time of the various carbonaceous materials in a Mn(NO$_3$)$_2$ aqueous solution.

Measurement of Physical Properties of Activated Carbon Assessments of Manganese Ion Adsorption 1; pH Measurement A carbon black (CB) having the physical properties shown in the following Table 1 and having no pore and three activated carbons of Cmi, Cme, and Cma which have the difference pore distribution are dipped in 0.5 mol of $Mn(NO_3)_2$ aqueous solution for 12 hours and measured for pH at the early, after 1 hour, and after 12 hours, and the results are shown in FIG. 2.

In the following Table 1, the specific surface area is measured by BET measuring equipment. In addition, in the following Table 1, micropore refers to a pore having a size distributing from about 5 Å to about 20 Å; mesopore refers to a pore having a size distributing from greater than about 20 Å and less than or equal to about 500 Å or less; and macropore refers to a pore having a size of more than about 500 Å.

TABLE 1

| | Specific surface area ($m^2/g$) | Average pore size (Å) | Total pore volume ($cm^3/g$) | Micro pore volume ratio (%) | Mesopore volume ratio (%) | Macropore volume ratio (%) |
| --- | --- | --- | --- | --- | --- | --- |
| Cmi | 1,390 | 16 | 0.634 | 84.9 | 15.1 | — |
| Cme | 1,480 | 47 | 0.817 | 65.4 | 34.6 | — |
| Cma | 1,190 | 180 | 1.689 | 1.2 | 72.7 | 26.1 |

As shown in FIG. 2, in the case of using the carbon black (CB) formed with no pore, pH is little changed even after passing 12 hours. In other words, the early pH is changed within about 1 from 1 hour to 12 hours.

In addition, it is confirmed that the activated carbon of Cma formed with macropore changes little of pH. On the other hand, the activated carbons of Cmi and Cme formed with micropore and mesopore significantly change pH. Particularly, the activated carbon of Cme formed with more micropore than mesopore in the volume ratio significantly increases pH within the short time of about one hour.

These results are obtained from that the micropore or mesopore absorbs $Mn^{2+}$ ion to decrease $Mn^{2+}$ ion remained in the solution when the activated carbons of Cmi and Cme are dipped in $Mn(NO_3)_2$ aqueous solution, so that the solution is neutralized to provide the pH into near 7. From the results, it is anticipated that the activated carbon formed with micropore or mesopore may well absorb the eluted $Mn^{2+}$ ion when the activated carbon formed with micropore or mesopore is used in a positive electrode for a rechargeable lithium battery.

Experimental Example 2

Evaluation of Manganese Ion Adsorption 2; Resistance Measurement

Each of carbon black (CB) formed with no pore and three activated carbons of Cmi, Cme, and Cma having different pores used in the Experimental Example 1 is added into 0.5 mol of $Mn(NO_3)_2$ aqueous solution in an amount of 1 wt %, respectively. Then, the obtained activated carbon containing liquid is agitated for 12 hours and measured for the resistance after one hour and 12 hours using a platinum electrode (available from Metrohm AG) by a resistance analysis (available from HIOKI corporation). The relative resistance rate of the measured resistance to the resistance of 0.5 mol of $Mn(NO_3)_2$ aqueous solution is calculated (the changed resistance after the test/resistance of 0.5 mol of $Mn(NO_3)_2$ solution), and the results are shown in FIG. 3.

Figure 3:
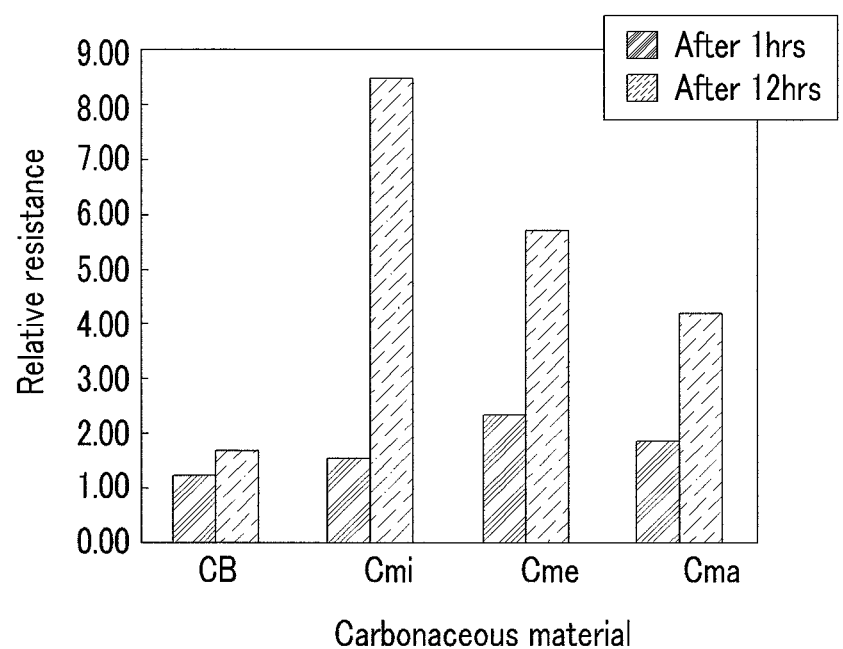
FIG. 3 is a graph showing the resistance change according to the dipping time of the various carbonaceous materials in a Mn(NO$_3$)$_2$ aqueous solution.

As shown in FIG. 3, the relative resistance is insignificantly increased even after passing 12 hours when adding carbon black.

However, it is confirmed that the activated carbons of Cmi, Cme, and Cma formed with pores remarkably increase the relative resistance. Particularly, the resistance is significantly increased after 12 hours more than after one hour. This is because $Mn^{2+}$ ion remained in the activated carbon-containing liquid is decreased by absorbing $Mn^{2+}$ ion into pore formed in the activated carbon, so as to decrease the conductivity and to increase the resistance. Particularly, the activated carbons of Cmi and Cme formed with micropore or mesopore significantly increase the resistance, so it is confirmed that $Mn^{2+}$ ion is remarkably decreased in the activated carbon-containing liquid. Thereby, it is understood that micropore or mesopore has an excellent ability of absorbing $Mn^{2+}$ ion. From the results, it is also understood that manages ion may be present in the state of being adsorbed and trapped in micropore and mesopore formed in the activated carbon of Cmi and the activated carbon of Cme in the battery when the battery includes the positive electrode with activated carbon of Cmi or activated carbon of Cme.

Experimental Example 3

Thermogravimetric Analysis

Figure 4:
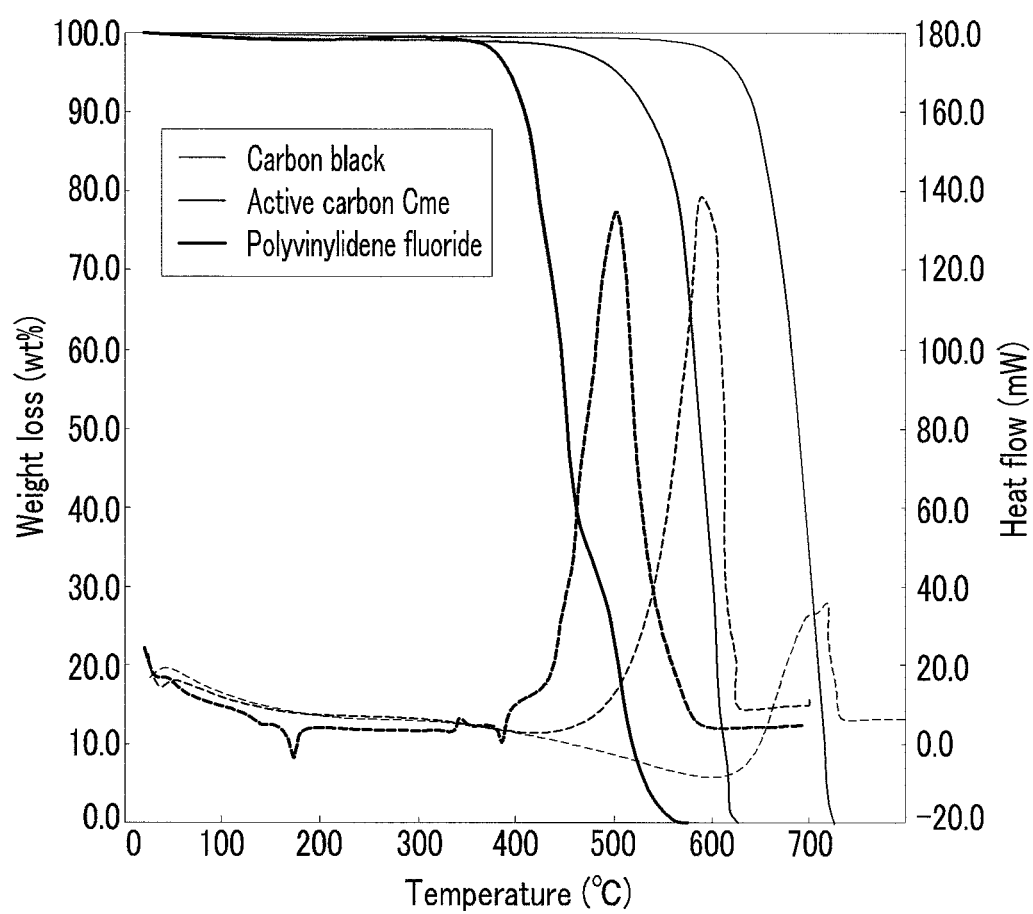
FIG. 4 is a graph showing the thermogravimetric analysis results of carbon black, activated carbon, and polyvinylidene fluoride.

The carbon black formed with no pore and the activated carbon of Cme formed with mesopore used in Experimental Example 1 and polyvinylidene fluoride are carried out with a thermogravimetric analysis (TGA) using a TGA-DSC equipment, and the results are shown in FIG. 4. The thermogravimetric analysis is performed by heating the specimen by increasing a temperature at an increasing rate of about 5° C./min and monitoring the weight loss under the condition of blowing the air.

As shown in FIG. 4, the activated carbon of Cme is began to decompose at the temperature of about 500° C. which is higher than the oxidation-decomposition temperature of polyvinylidene fluoride binder which is a generally-used electrode binder, and lower than the oxidation-decomposition temperature of carbon black which is a generally-used conductive agent. In addition, it is mainly oxidized-decomposed at around 600° C.

Example

Fabrication of Rechargeable Lithium Battery Cell

The activated carbons, Cmi, Cme, and Cma, used in the following Examples have the physical properties shown in Table 1 of Experimental Examples.

Example 1

90 wt % of positive active material of $LiMn_2O_4$, 5 wt % of binder of polyvinylidene fluoride, 3 wt % of conductive material of carbon black (super-P), and 2 wt % of activated carbon of Cmi in which micropores are developed are mixed in a solvent of M-methylpyrrolidone (NMP) to provide a positive active material slurry.

The positive active material slurry is coated on an Al-foil current collector according to the general electrode manufacturing process to provide a positive electrode.

A negative active material of graphite and a binder of styrene butadiene rubber (SBR), and a thickener of carboxyl methyl cellulose (CMC) are mixed in a solvent of N-methylpyrrolidone to provide a negative active material slurry. The negative active material, the binder, and the thickener are included in 97.5 wt %, 1.5 wt %, and 1 wt %, respectively.

The negative active material slurry is coated on a Cu-foil current collector according to the general electrode manufacturing process to provide a negative electrode.

Using the obtained positive electrode, the negative electrode, and the non-aqueous electrolyte, a rechargeable lithium battery is fabricated according to the general method. The non-aqueous electrolyte is prepared by dissolving 1.5 mol/L of $LiPF_6$ in a mixed solvent (3:3:4 volume ratio) of ethylene carbonate (EC):ethyl methyl carbonate (EMC):dimethyl carbonate (DMC).

Example 2

A rechargeable lithium battery is fabricated in accordance with the same procedure as in Example 1, except that an activated carbon of Cmi and an activated carbon of Cme that mesopores are developed are mixed in a volume ratio of 8:2 and used instead of the activated carbon of Cmi that micropores are developed.

Example 3

A rechargeable lithium battery is fabricated in accordance with the same procedure as in Example 1, except that an activated carbon of Cmi and an activated carbon of Cme are mixed in a volume ratio of 5:5 and used instead of the activated carbon of Cmi that micropore is developed.

Example 4

A rechargeable lithium battery is fabricated in accordance with the same procedure as in Example 1, except that an activated carbon of Cmi and an activated carbon of Cme are mixed in a volume ratio of 2:8 and used instead of the activated carbon of Cmi that micropore is developed.

Example 5

A rechargeable lithium battery is fabricated in accordance with the same procedure as in Example 1, except that the activated carbon of Cmi that micropore is developed and the conductive agent of carbon black are used in amount of 0.1 wt % and 4.9 wt %, respectively.

Example 6

A rechargeable lithium battery is fabricated in accordance with the same procedure as in Example 1, except that the activated carbon of Cmi that micropore is developed and the conductive agent of carbon black are used in an amount of 3 wt % and 2 wt %, respectively.

Comparative Example 1

92 wt % of a positive active material of $LiMn_2O_4$, 5 wt % of a binder of polyvinylidene fluoride, and 3 wt % of a conductive agent of carbon black (super-P) are mixed in a solvent of N-methylpyrrolidone (NMP) to provide a positive active material slurry.

A rechargeable lithium battery is fabricated in accordance with the same procedure as in Example 1, except that the obtained positive active material slurry is used.

Reference Example 1

A rechargeable lithium battery is fabricated in accordance with the same procedure as in Example 1, except that an activated carbon of Cma that is formed with macropores is used instead of the activated carbon of Cmi that the micorpore is well developed.

Assessment of Cycle-Life Characteristic

Each rechargeable lithium battery obtained from the Examples 1 to 6, Comparative Example 1, and Reference Example 1 is measured for the cycle-life characteristic, and the results are shown in the following Table 2 and Table 3. The cycle-life characteristic is determined as the discharge capacity rate of the 200th cycle discharge capacity to the first cycle discharge capacity after charging and discharging at 1 C and at 45° C. for 200 times.

TABLE 2

| Battery cell | Mixing ratio of activated carbons (volume ratio) (Cmi:Cme:Cma) | Cycle-life (%) |
|---|---|---|
| Comparative Example 1 | 0:0:0 | 72.6 |
| Example 1 | 10:0:0 | 85.4 |
| Example 2 | 8:2:0 | 86.1 |
| Example 3 | 5:5:0 | 84.8 |
| Example 4 | 2:8:0 | 82.4 |
| Reference Example 1 | 0:0:10 | 77.6 |

As shown in Table 2, Examples 1 to 4 including the activated carbon of Cmi that micropores are developed or the activated carbon of Cme that mesopores are developed have more excellent cycle-life characteristic than Comparative Example 1 including no activated carbon and Reference Example 1 including the activated carbon of Cma formed with macropore. Particularly, Example 2 including the activated carbon of Cmi and the activated carbon of Cme in a volume ratio of 8:2 has the most excellent cycle-life characteristic.

TABLE 3

| Battery cell | Amount of activated carbon (wt %) | Cycle-life (%) |
|---|---|---|
| Comparative Example 1 | 0 | 72.6 |
| Example 5 | 0.1 | 75.4 |
| Example 1 | 2 | 85.4 |
| Example 6 | 3 | 84.9 |

As shown in Table 3, Example 5, Examples 1 and 6 including 0.1 wt %, 2 wt %, and 3 wt % of activated carbon of Cmi that micropores are developed have the more excellent cycle-life characteristics than Comparative Example 1 including no activated carbon. Particularly, Example 1 including 2 wt % of activated carbon of Cmi shows the most excellent cycle-life characteristic result.

While this disclosure has been described in connection with what is presently considered to be practical example embodiments, it is to be understood that the embodiments are not limited to the disclosed embodiments, but, on the contrary, is intended to cover various modifications and equivalent arrangements included within the spirit and scope of the appended claims. Therefore, the aforementioned embodiments should be understood to be examples but not limiting the present embodiments in any way.

What is claimed is:

1. A rechargeable lithium battery comprising:
    a positive electrode comprising a positive active material layer,
    a negative electrode comprising a negative active material, and
    an electrolyte
    wherein the positive active material layer comprises a positive active material, a binder, a conductive material, and an activated carbon,
    wherein the activated carbon includes micropores having a size of about 5 Å to about 20 Å configured to adsorb and trap manganese ions, and
    wherein the activated carbon is included in an amount of about 0.1 wt % to about 3 wt % based on the total weight of the positive active material layer; and
    wherein the activated carbon comprises mesopores having a size greater than about 20 Å and less than or equal to about 500 Å;
    wherein the volume ratio of micropores to mesopores is 90:10 to 80:20.

2. The rechargeable lithium battery of claim 1, wherein the activated carbon has a specific surface area of about 1,000 m$^2$/g or more.

3. The rechargeable lithium battery of claim 1, wherein the activated carbon has a specific surface area of about 1,000 m$^2$/g to about 2,500 m$^2$/g.

4. The rechargeable lithium battery of claim 1, wherein the activated carbon is included in an amount from about 0.1 to about 2 wt % based on the total weight of positive active material layer.

5. The rechargeable lithium battery of claim 1, wherein the activated carbon is amorphous carbon.

6. The rechargeable lithium battery of claim 1, wherein the activated carbon begins to oxidize-decompose prior to about 600° C. when it is heated by increasing a temperature an increasing rate ranging from of about 1° C./min to about 10° C./min.

7. The rechargeable lithium battery of claim 1, wherein the positive active material comprises a compound selected from the group consisting of the compounds represented by the following Chemical Formulae 1 and 2, and a combination thereof:

$$Li_aMn_{2-b}D_bO_{4-c}J_c \qquad \text{[Chemical Formula 1]}$$

wherein,
D is selected from the group consisting of Al, Ni, Co, Mn, Cr, Fe, Mg, Sr, V, a rare earth element, and a combination thereof,
J is selected from the group consisting of F, S, P, and a combination thereof, and
0.90≤a≤1.8, 0≤b≤0.5, and 0≤c≤0.05, and $$Li_aMn_bCo_cNi_dL_eO_2 \qquad \text{[Chemical Formula 2]}$$

wherein,
L is Al, Cr, Mn, Fe, Mg, La, Ce, Sr, V, or a combination thereof, and
0.90≤a≤1.8, 0≤b≤0.9, 0≤c≤0.5, 0≤d≤0.5, and 0.001≤e≤0.1.

8. A positive active material layer comprising:
    a positive active material, a binder, a conductive material, and an activated carbon,
    wherein the activated carbon includes micropores having a size of about 5 Å to about 20 Å configured to adsorb or trap manganese ions, and
    wherein the activated carbon is included in an amount of about 0.1 wt % to about 3 wt % based on the total weight of the positive active material layer; and
    wherein the activated carbon comprises mesopores having a size greater than about 20 Å and less than or equal to about 500 Å;
    wherein the volume ratio of micropores to mesopores is 90:10 to 80:20.

9. The positive active material layer of claim 8, wherein the activated carbon is included in an amount from about 0.1 to about 2 wt % based on the total weight of positive active material layer.

10. The positive active material layer of claim 8, wherein the activated carbon is amorphous carbon.

11. The positive active material layer of claim 8, wherein the positive active material comprises a compound selected from the group consisting of the compounds represented by the following Chemical Formulae 1 and 2, and a combination thereof:

$$Li_aMn_{2-b}D_bO_{4-c}J_c \qquad \text{[Chemical Formula 1]}$$

wherein,
D is selected from the group consisting of Al, Ni, Co, Mn, Cr, Fe, Mg, Sr, V, a rare earth element, and a combination thereof,
J is selected from the group consisting of F, S, P, and a combination thereof, and
0.90≤a≤1.8, 0≤b≤0.5, and 0≤c≤0.05, and $$Li_aMn_bCo_cNi_dL_eO_2 \qquad \text{[Chemical Formula 2]}$$

wherein,
L is Al, Cr, Mn, Fe, Mg, La, Ce, Sr, V, or a combination thereof, and
0.90≤a≤1.8, 0≤b≤0.9, 0≤c≤0.5, 0≤d≤0.5, and 0.001≤e≤0.1.

* * * * *